United States Patent [19]

Gelchinsky

[11] Patent Number: 4,878,205
[45] Date of Patent: Oct. 31, 1989

[54] METHOD OF ANALYZING THE STRUCTURE OF A MEDIUM, PARTICULARLY USEFUL FOR SEISMIC PROSPECTING

[76] Inventor: Boris Gelchinsky, 12/16 Mivtzah Yonatan, Kfar Save 44 221, Israel

[21] Appl. No.: 217,269

[22] Filed: Jul. 11, 1988

[30] Foreign Application Priority Data

Jul. 23, 1987 [IL] Israel ....................................... 83306

[51] Int. Cl.$^4$ ............................................... G01V 1/36
[52] U.S. Cl. ........................................ 367/61; 367/53; 367/51
[58] Field of Search ....................... 367/38, 50, 51, 52, 367/53, 61; 364/421

[56] References Cited

U.S. PATENT DOCUMENTS

| | | | |
|---|---|---|---|
| 4,363,113 | 12/1982 | Taner et al. ............................ | 367/63 |
| 4,503,527 | 3/1985 | Pann ...................................... | 367/53 |
| 4,742,497 | 3/1988 | Beasley et al. ........................ | 367/52 |

OTHER PUBLICATIONS

Exploration Geophysics, The Bulletin of the Australian Society of Exploration Geophysics, Conference, Adelaide, Australia, 2/14/88, ISSN 0812-5985.

*Primary Examiner*—Thomas H. Tarcza
*Assistant Examiner*—Ian J. Lobo
*Attorney, Agent, or Firm*—Benjamin J. Barish

[57] ABSTRACT

Method of analyzing the structure of a medium by means of waves reflected by inner interfaces, comprises: (a) generating multiple coverage data represented by traces corresponding to a plurality of source-receiver pairs distributed according to an asymetric polynomial distribution with respect to a predetermined central point with optimal parameters which provide that all reflected events of such traces correspond to the same common reflecting point on a reflecting interface; (b) correcting the recorded traces according to an optimal time delay correction which converts all reflected events to the same phase and which depends on the local parameters of wave propagation velocity Vo at the reference level, and of radius of curvature $r_o$ of the wavefront emitted by a fictitious source located at the common reflecting point and coming to the central point at an angle of entry $\beta o$; (c) stacking the corrected recorded traces; (d) repeating (a), (b) and (c) for a plurality of predetermined common reflecting points to produce a plurality of the stacked traces; and (e) utilizing the stacked traces and parameters ro and $\beta o$ as a function of the predetermined central point and the time $t_o$ of registation of the data at this point for determining the structure of the medium.

13 Claims, 9 Drawing Sheets

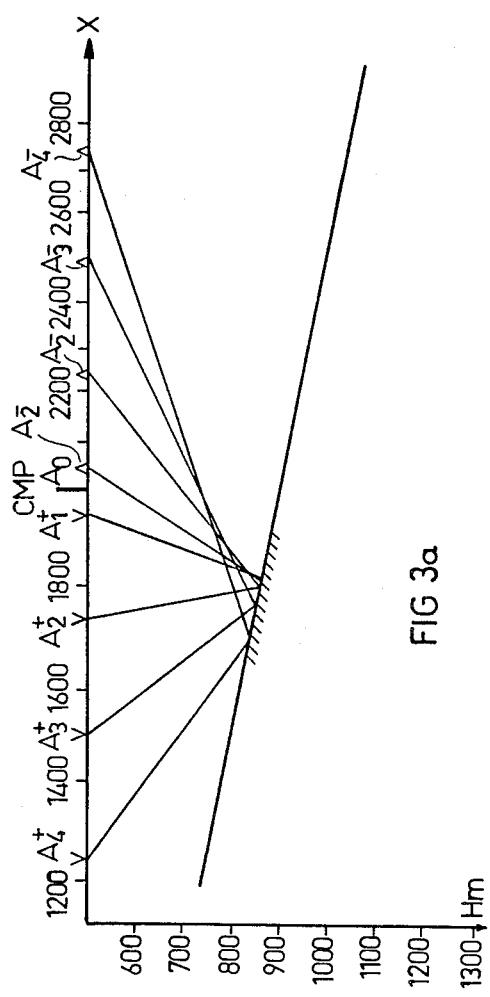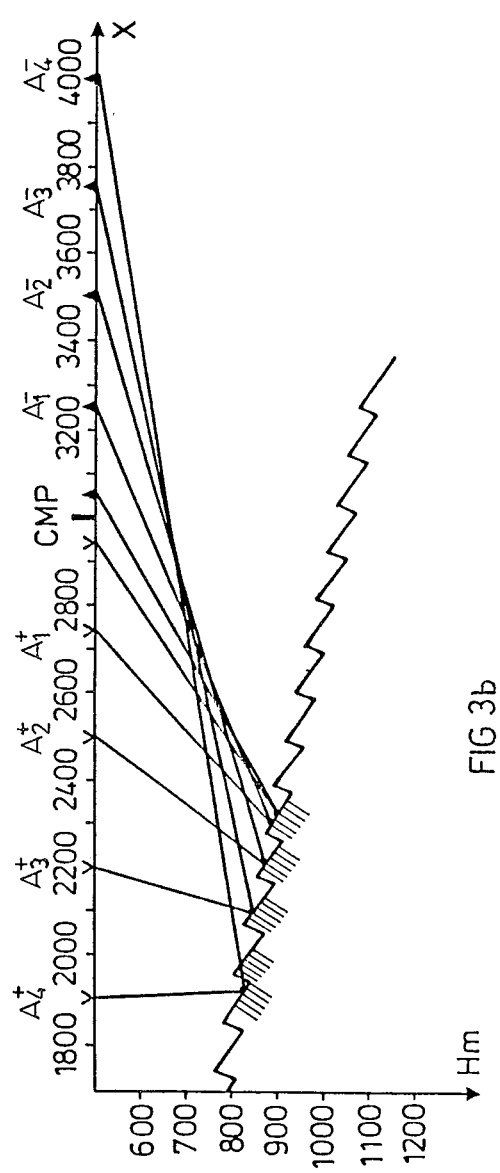

METHOD OF ANALYZING THE STRUCTURE OF A MEDIUM, PARTICULARLY USEFUL FOR SEISMIC PROSPECTING

FIELD OF THE INVENTION

This invention relates to a method of analysing the structure of a medium by means of waves reflected by inner interfaces. While the invention is useful in a large number of applications, including tomographic and non-destructive testing of bodies, the invention is particularly useful in seismic prospecting, and is therefore described below with respect to this application.

BACKGROUND OF THE INVENTION

The aim of seismic exploration is to determine and display the nature of the subsurface structure of the earth by seismic methods. Exploration seismology is divided into two branches: reflection seismology and refraction seismology. Reflection seismology is a method of mapping the subsurface sedementary rock layers from measurements of the arrival times of events reflected from the subsurface layers. The present invention is applicable primarily to reflection seismology.

The seismic field in the Earth is generated by a source, or by plurality of sources, located on or near the Earth's (so-called) free surface. The seismic waves propagate down and reflect from subsurface interfaces. The reflected waves return to the free surface and are detected by a plurality of receivers located along a seismic line or at grid points (FIG. 1). These receivers transform the seismic oscillations into electrical signals which are suitable for later processing. This technique is called "reflecting shooting".

The main object of data processing in reflecting shooting is to select useful reflected waves (primaries) carrying information about deep sub-surface structures, and to suppress unwanted signals (multiples, refracted, surface and other types of waves) and noise.

One of the most powerful tools in reflected waves data processing is the so-called Common Depth Point (CDP) method. The seismic data in the CDP method is generated and collected by source-receiver pairs via ray paths shown in FIG. 2. The midpoint between source and receivers is labeled Ao. The positions of a source and a receiver corresponding to the one trace (pair) are labeled $A_k^+$ and $A_k^-$. Their coordinates $X^+_k$ and $X^-_k$ are determined by the relationship:

$$X_0 = \frac{X_k^+ + X_k^-}{2} \quad (k = 0, 1, 2, \ldots, K - 1).$$

Thus all pairs $A_k^+$ and $A_k^-$ have the same middle point; therefore the CDP method is also called the Common Middle Point (CMP) method.

The display of seismic traces associated with the CDP configuration of source-receiver pairs is called the CDP (or CMP) gather, or the CDP seismogram. Summing (or stacking) of traces of a CDP gather is based to the CDP method.

It is necessary to introduce so called static and dynamic correction to each trace before stacking. The static correction is to compensate for the irregularities in reflection arrival times resulting from near surface variation in elevation, weathering thickness, and weathering velocity. The object of the static correction is to reduce each trace to a "flat" reference (datum) level without the weathering zone.

The dynamic correction is a time-device correction which is needed because of the existence of a difference $\Delta\tau k$ of reflection arrival times at the (k-th) trace and of the predetermined central (zero offset) trace $t_o$. The value $\Delta\tau k$ is called a Normal Moveout (NMO) and can be computed with the help of the following approximate relationship:

$$\Delta T_k = \sqrt{t_o^2 + \frac{(X_k^- - X_k^-)^2}{V_s(t_o)^2}}$$

where Vs(to) is a so-called stacking velocity for zero time to. If values of Vs are correctly selected, the NMO correction puts all primary reflections on traces of a CDP gather in phase; after this, all traces of a CDP gather are stacked. Thus, one output trace, called a stacked trace, is obtained for each middle point Ao. In many cases primaries on an optimal stacked trace are enhanced against unwanted waves and noise.

A stacked section, called a time section can be obtained by repeating the stack for a sequence of middle points and plotting the obtained CDP stacked traces $\mu(xo,to)$ as a two-dimentional function of middle point coordinate xo and the half two-way zero time to. The time section is an image of a subsurface structure, but it is a distorted image because reflections from dipping and curved interfaces actually come not from directly under the halfway position as plotted. To remove this distortion a special, technique called migration, is applied to time sections.

Usually summation of fields causes a decrease of resolution. However, if the reflectors are horizontal, or near-horizontal, and the overburden is a horizontal stratified medium, then the CDP stack is not accompanied by a noticeable diminution of resolution as compared with unstacked traces, because all traces of the CDP gather correspond to one specular point (FIG. 2). If the reflector is a dipping interface, and/or the overburden is not a horizontal layered medium, the different specular points on a reflecting surface correspond to different traces Uk($\Delta$ X) of the CMP gather (FIG. 3). In these cases, stacking of traces is accompanied with a decrease in resolution (smearing of the reflecting surface). This effect is especially present for reflectors with complex topography (FIG. 3a) or with noticeable variation of reflecting properties along the surface.

To avoid such a smearing of the reflector and other accompanying unwanted effects, special methods of processing multifold data, called Partial Prestack Migration (PPM) or Dip Moveout (DMO), have been developed. There are different modifications of this method. In all these modifications, in order to improve the resolution of the stacking process, it is necessary that reflected events on all field traces in the stacked gather correspond to a Common Reflecting Point (CRP) as defined by the normal incident ray (FIG. 4). To achieve this goal, the DMO data processing includes both a space correction and a time correction for each sample of an input field datum. After migrating the prestack data to the true position, the common midpoint stack is performed. In order to actually find the true values of the space and time corrections, it is necessary in the DMO method to have initially a good estimate model of the overburden and the dipping of the reflector.

SUMMARY OF THE INVENTION

According to the present invention there is provided a method of analysing the structure of a medium by means of waves reflected by inner interfaces, comprising:

(a) generating multiple coverage data represented by traces corresponding to a plurality of source-receiver pairs distributed according to an asymetric polynomial distribution with respect to a predetermined central point with optimal parameters which provide that all reflected events of such traces correspond to the same common reflecting point on a reflecting interface;

(b) correcting the recorded traces according to an optimal time correction which converts all reflected events to the same phase and which depends on local parameters of wave propagation velocity Vo at the reference level, and of radius of curvature $r_o$ of the wavefront emitted by a fictitious source located at the common reflecting point and coming to the central point at an angle of entry $\beta o$;

(c) stacking said corrected recorded traces;

(d) repeating (a), (b) and (c) for a plurality of predetermined central reflecting points to produce a plurality of the stacked traces; and (e) utilizing said stacked traces and parameters $r_o$ and $\beta o$ as a function of the predetermined central point and the time $t_o$ of registration of the data at this point for determining the structure of the medium.

As indicated earlier, the method is particularly applicable for seismic prospecting, whereupon the recorded traces would be seismic traces. The invention, however, could also be used for tomographic or non-destructive testing of a body, whereupon the recorded traces would be reflected sonic waves applied to the tested body.

According to a further feature of the described embodiments of the invention, the method includes the further step, following step (c), of producing an image of the common reflecting point having coordinates depending on the parameters $r_o$ and $\beta o$ of the time delay correction, step (d) producing an image of the inner interfaces.

According to one described embodiment, step (a) is performed by distributing the source-receiver pairs in the field according to the given polynomial distribution, and step (b) is performed according to the given time delay correction.

According to another described embodiment, steps (a) and (b) are formed with traces recorded in the field by distributing the source-receiver pairs in the field according to an arbitrary, i.e., non-polynomial, distribution, and under conditions that the parameters the polynomial distribution and the time delay correction are predetermined; and a plurality of synthetic traces, called synthetic gather, are generated from said field data by:

(1) determining the optimal offset of one of each source-receiver pair on a small arm of a spread, corresponding to the actual given field position of the other of the pair on a long arm;

(2) determining the time delay corrections corresponding to both actual neighbouring and optimal positions of the source-receiver pairs;

(3) obtaining the corrected traces by introducing the said time delay correction in said traces recorded in the field; and (4) generating said synthetic traces by weighing in pairs the corrected traces obtained in step (3) above, and stacking them. by stacking them in pairs and weight corrected as in said corrected traces under step (3) above.

According to a still further described embodiment, steps (a), (b) and (c) are performed with traces recorded in the field by distributing the source-receiver pairs in the field according to arbitrary non-polynomial distributions and under conditions that the optimal parameters of said polynomial distribution and said time delay correction are not known; and a plurality of synthetic gathers are generated for a plurality of predetermined combinations of said parameters from the said field data by:

(1) measuring values of chosen criteria of coherence for various corrected synthetic gathers generated from the field recorded traces for said combination of parameters of the polynomial distribution and of the time delay correction;

(2) optimizing the results of the coherence measurements at each moment of zero time $t_o$; and (3) determining the parameters of an optimally corrected polynomial gather and of the optimal stacked wave field at each moment of zero time $t_o$.

BRIEF DESCRIPTION OF THE DRAWINGS

The invention is herein described, somewhat schematically and by way of example only, with reference to the accompanying drawings, wherein:

FIGS. 3a and 3b illustrate the Common Middle Point (CMP) technique and the ray paths produced with a dip-plane inner face (FIG. 3a) and a dip-corrugated inner face (FIG. 3b);

MATHEMATICAL CONSIDERATIONS

Figure 1:
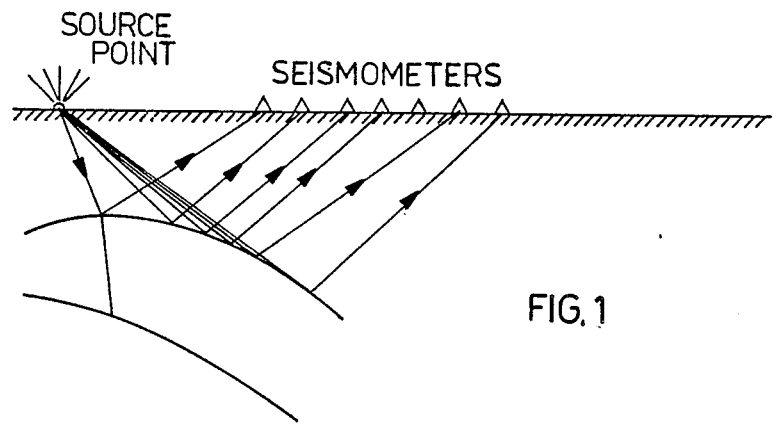
FIG. 1 diagrammatically illustrates the "reflecting shooting" technique, including the reflected waves returned to the free surface for detection by a plurality of receivers located along a seismic line or at grid points.
Figure 2:
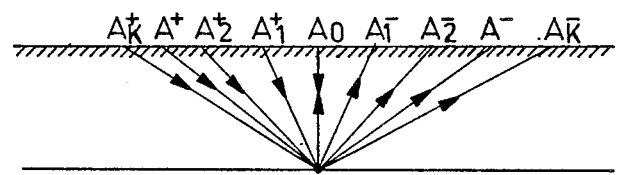
FIG. 2 illustrates the Common Depth Point (CDP) technique, including the ray paths produced in the case of a horizontally-layered overburden and horizontal reflecting underface.
Figure 4:
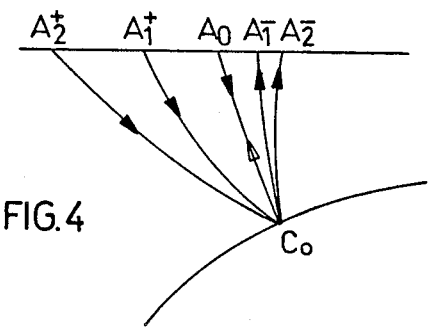
FIG. 4 illustrates the ray paths for the Common Reflecting Point in the case of a dip-plane inner face and a non-homogeneous overburden.

In order to achieve correspondence of events reflected from certain interface and recorded on all traces in the gather to the same specular point (namely the CRP), it is proposed to collect these traces in the following way. The predetermined zero-offset record becomes a center trace of a fixed number of immediately adjacent traces. The distances of a source and a receiver of the k-th pair (trace) corresponding to the quasi-focusing distributions, are determined by the two following associated polynomial distributions:

$$\Delta X_k^+ = y_k + \sum_{m=1}^{N} a_m y_k^{m+1}$$

$$\Delta X_k^- = -y_k + \sum_{m=1}^{N} a_m (-y_k)^{m+1}$$

$$(k = 0, 1, 2, \ldots K - 1)$$

where k is a number of a seismic trace (source-receiver pair), K is the number of the seismic traces, $\Delta X^+_k$ is the offset of one of the pair on a long arm of an arrangement (spread), $\Delta X^-_k$ is the offset of the other of the pair on a short arm, $a_m$ is a given polynomial coefficient, N is a given order of the polynomial, $y_k$ is an independent variable, which takes values from a given sequence of numbers (e.g., for discrete set $y_k = 0, 1, \ldots K-1$).

As it is easy to see, the arguments of two given polynomial distributions corresponding to the k-th trace have equal modules but different signs, so the offsets $\Delta X^+_k$ and $\Delta X^-_k$, associated with the same k-th trace are not equal. Thus, a center point divides the optimal quasi-focusing spread into two unequal arms. The degree of non-uniformity and asymmetry of the associated distributions is determined by the value of each m-th coefficient $a_m$, which is called a factor of asymmetry of the m-th order, or in short, the asy-factor of the m-th order. The coefficient $a_2$ called simply the asy-factor. The value of $a_m$ depends of a structure of the overburden and geometry of a coming wavefront.

For most practical applications the associated binomial distributions $$\Delta X_k^+ = y_k + a y_k^2$$

$$\Delta X_k^- = -y_k + a y_k^2$$

$$(k = 0, 1, 2, \ldots, K - 1)$$

can be sufficiently good approximation with the asy-factor $a$ determined by the relationship $$a = \sin\beta_o / r_o + 2\sin\beta_o L^1 / L_o^3$$

where $r_o$ is, as earlier the radius of curvature of a wavefront emitted by a fictitious source located at the CRP on a reflecting interface and coming at the predetermined central point at an angle $\beta_o$, $L_o$ and $L_o^1$ is a spreading function, characterizing the divergence of rays emitted by the fictitious source and its derivative with respect to an angle of radiation. If inhomogeneity of the overburden is not very large, then the second term in the relationships for the asy-factor can be neglected, so $$a = \sin\beta_o / r_o$$

Exploiting an approximate character of the binomial (polynomial) distributions one could by means of mathematical manipulation transform the above expressions to other forms, which give approximately the same values of offsets $\Delta X^+_k$ and $\Delta X^-_k$, as the binomial (polynomial) ones. These forms are called equivalently binomial (polynomial) distributions. For example, using the formula $1 \pm dy_k = 1/(1+dy_k) + O(d^2y^2)$, one could rewrite the expressions for the binomial distributions in the forms $$\Delta X_k^+ = y_k/(1 - ay_k), \Delta X_k^- = -y_k/(1 + ay_k)$$

$$(X = 0, 1 \ldots K - 1)$$

Another form of the quasi-focusing distributions can in practice be implemented in the following way. The field or synthetic seismic traces of a multiple coverage system of observation are generated according to a given arbitrary distribution of one of the source-receiver pair along a long arm and according to the following quasi-focusing distribution of the other of the pair along a short arm:

$$\Delta X_k^- = -y_k + \sum_{m=1}^{N} a_m (-y_k)^{m+1}$$

where $y_k$ is a root of the following polynomial equation $$y_k + \sum_{m=1}^{N} a_m (y_k)^{m+1} = \Delta X_k^+$$

where $\Delta X^+_k$ is a number from the given arbitrary distribution of offsets along a large arm.

Following is another manner of producing the quasi-focusing distribution: The field or synthetic seismic traces of a multiple coverage system of observation are generated according to a given arbitrary distribution of one of the source-receiver pair $\Delta X^+_k$ along a large arm and according to the following quasi-focusing distribution of the other of the pair along of the short arm $$\Delta X_k^- = \Delta X_k^+ - 2y_k \ (K = 0, 1, 2, \ldots, K - 1)$$

where $$y_k = (\sqrt{1 + 4a\Delta X_k^+} - 1)/2a$$

$$a = \sin\beta_o / r_o$$

$\Delta X^+_k$ is a number from the given arbitrary distribution.

The corresponding expressions for the equivalently binomial distributions are $$\Delta X_k^- = -\Delta X_k^+ / (H2a\Delta X_k^+) \ (k = 0, 1 \ldots, K - 1).$$

The specific dynamic correction is determined according to the following relationship $$\Delta T_k = \frac{\sqrt{r_o^2 + 2r_o\Delta X_k^+ \sin\beta_o + (\Delta X_k^+)^2} + \sqrt{r_o^2 - 2r_o|\Delta X_k^-|\sin\beta_o + (\Delta X_k^-)^2} - 2r_o}{V_o}$$

where $\Delta \tau_k$ is a difference of arrival time of wave coming to the K-th trace and to the central trace; ro is, as earlier, the radius of curvature of wavefront emitted by the fictitious source located at the CRP and coming to the central point at an angle $\beta_o$, and Vo is a velocity of wave propagation near the reference level.

This form of a dynamic correction is called the Oblique Spherical Correction (OSC) because it is obtained under assumption that the said wavefront is a spherical one with the radius of curvature ro, of wavefront coming at the predetermined central point at an angle $\beta_o$.

In the case where at least one of the quasi-focusing distributions is binomial, the Oblique Spherical Correction is determined by the following relationship:

$$\Delta \tau_k = \frac{r_o(\sqrt{1 + 2\alpha\Delta X_k^+ + (\Delta X_k^+/r_o)^2} + \sqrt{1 - 2\alpha|\Delta X_k^-| + (\Delta X_k^-/r_o)^2} - 2)}{V_o}$$

which could be reduced to the expression $$\Delta \tau_k = 2r_o(\sqrt{1 + y_k^2/h^2} - 1)/V_o$$

where $$h = r_o/\cos\beta_o$$

Figure 5:
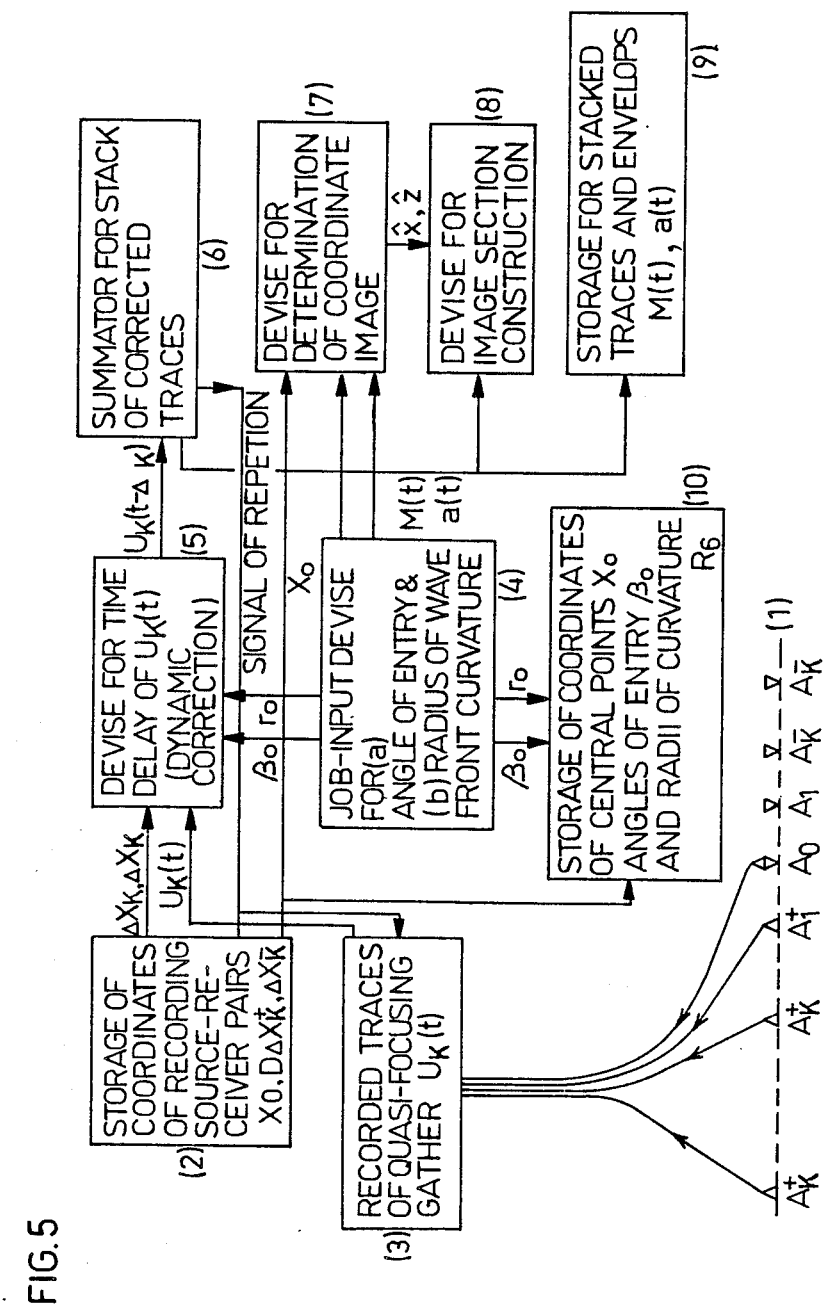
FIG. 5 is a block diagram illustrating the method and apparatus for seismic prospecting in accordance with the present invention.

In FIG. 5, the block-diagram for the Common Reflecting Element Section Construction is shown. The seismic traces recorded in the field by the quasi-focusingly distributed source-receiver pairs 1 and their coordinate (values of offsets and the coordinate of the central point) are sent to block 3 and 2 respectively. The job-input devices 4a and 4b send values of the parameters $\beta_o$ and ro of the Oblique Spherical Correction in device 5 for time delay, which also receives each recorded trace $U(t,\Delta X^+_k,\Delta X^-_k) = U_k(t)$ from the storage 3. After the dynamic correction is performed in block 5 the corrected trace $U(t-\Delta\tau_k, \Delta X^+_k, \Delta X^-_k) = U_k(t-\Delta\tau_k)$ is sent in the summator 6 for the stack. In the 1 ast, the envelope $a(t_o)$ of the stacked trace $M(t_o)$ are also determined. The stacked trace and their envelope are sent in the storage 7. In the block 8 the coordinates of the central points and corresponding parameters at the Oblique Spherical Correction are stored. The found values ro and $\beta_o$ can be used for determination of Cartesian coordinates $\hat{X}$ and $\hat{Z}$ of the point image $\hat{C}_o$ of the Common Reflecting Point, corresponding to the predetermined central points Ao(xo) with help of the relationship (block 7)

$$X = x_o + r_o\sin\beta_o, \quad Z = r_o\cos\beta_o$$

The envelope $a(\hat{X},\hat{Z})$ of the stacked field $M(t_o,r_o,\sin\beta_o) = M/\hat{X},\hat{Z}$, corresponding to the optimal corrected quasi-focusing gather gives an image of the Common Reflecting Point.

After repeating the foregoing procedure for a plurality of predetermined center points, a plurality of envelopes $a(\hat{X},\hat{Z})$ are determined. Some of found envelopes could have the same arguments $\hat{X}$ u $\hat{Z}$, in this case the total amplitude $a(X,Z)$ in the image point $\hat{C}(\hat{X},\hat{Z})$ is a sum of all envelops $A(\hat{X},Z)$ having the same arguments $\hat{X}$ and $\hat{Z}$.

The determined values of radii ro and of angles of entry $\beta_o$ for a plurality of predetermined central points can also be used as input data for migration of stacked fields to their real positions in a medium.

Figure 6:
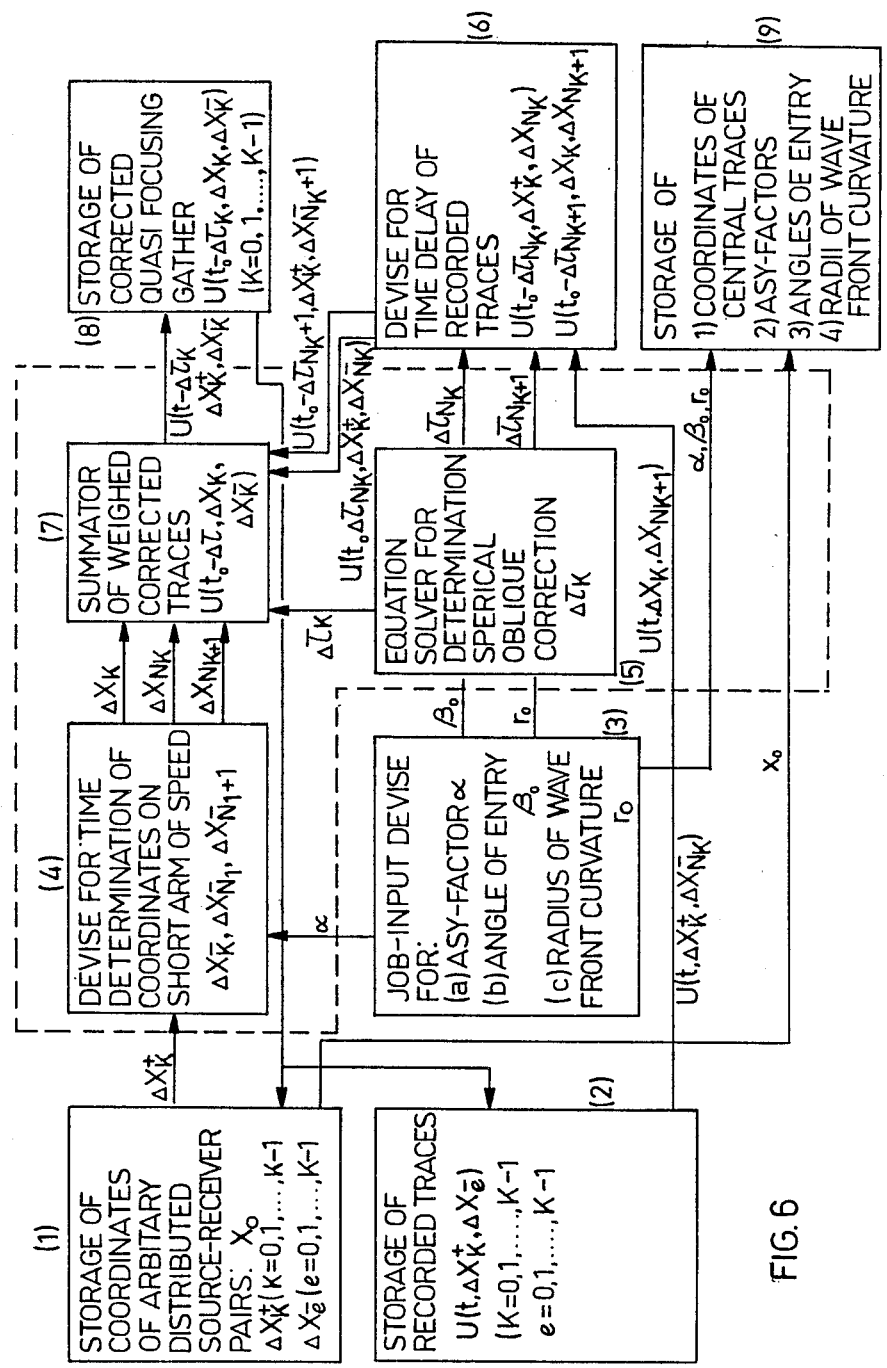
FIG. 6 is a block diagram illustrating the method and apparatus for generating the corrected quasi-focusing gather wherein the parameters are known beforehand.

It could be inconvenient to implement in the field a non-uniform asymmetrical acquisition system of transmitters and geophones, corresponding to any of the above-described forms of quasi-focusing distribution of sources-receiving pairs. For this more common situation, while in the field seismic traces are recorded according to the given arbitrary distribution of sources and receiver, two additional methods are proposed:

In one of them, it is assumed that a plurality of seismic traces are recorded in the field by arbitrarily distributed sources and receiver, and that the parameters of the said optimal quasi-focusing distributers and of the optimal Oblique Spherical Correction are given. Then a plurality of optimally quasi-focusingly distributed and optimally dynamically corrected synthetic traces, called an optimal corrected quasi-focusing gather, is generated in the following way as illustrated in FIG. 6.

The field recorded traces $U(t,\Delta X^+_k,\Delta X^-_l)$, and the arbitrary distributed coordinates of one of the source-receiver pairs $\Delta X^+_k(k=0,1,\ldots,K-1)$ and of the other of this pair $\Delta X^-_l(l=0,1,\ldots,K-1)$ are placed in the storages devices 2 and 1. If the parameters of the given quasi-focusing distribution are such that the coordinates $\Delta X^+_k$ correspond to a long arm of the spread, then the first given coordinate $\Delta X^+_1$ from storage device 1, and the given value of the asy-factor $\alpha$ in the case of the binomial root distribution (or the given values of $\alpha m$ in the case of the polinominal root distribution) from device 3a, are sent to block 4 for determination of a corresponding coordinate $\Delta X^-_1$ on a short arm according to the presented above expression for binomial (or polynomial) root distribution. In the same device 4, the neighbouring actual arbitrary distributed coordinates $\Delta X^-_{N1}$ and $(|\Delta X^-_{N1}| < |\Delta X^-_1| < |\Delta X^-_{N1+1}|)$ are determined. Then the given coordinates $\Delta X^+_1$ and the three found coordinates $\Delta X^-_1, \Delta X^-_{N1}, \Delta X^-_{N1+1}$ from block 4, the given value of the angle of entry $\beta_o$, and the radius of the wavefront curvature ro from the job-input 3b and 3c, are sent in the computer 5 for determination of three values $\Delta\tau_1$, $\Delta\tau_{N1}$ and $\Delta\tau_{N1+1}$ of the Oblique Spherical Correction according to the given above-given expressions for three neighbouring pairs $\Delta X^+_1$ and $\Delta X^-_1$, $\Delta X^+_1$ and $\Delta X^-_{N1}$, and $\Delta X^+_1$ and $\Delta X^-_{N1+1}$. A pair of recorded traces $U(t,\Delta X^+, \Delta X^-_{N1})$ and $U(t,\Delta X^+_1,\Delta X^-_{N1+1})$ from storage device 2 and the found values $\Delta\tau_{N1}$ and $\Delta\tau_{N1+1}$ from the computer 5 are sent to device 6 for the time delay and for obtaining the time-shifted traces:

$U(t-\Delta\tau_{N1}, \Delta X_1^+, \Delta X^-_{N1})$ and $U(t-\Delta\tau_{N1+1}, \Delta X_1^+, \Delta X^-_{N1+1})$.

The last two shifted traces from the block 6, the found coordinates $\Delta X^-_1, \Delta X^-_{N1}$ and $\Delta X^-_{N1+1}$ on a short arm from the block 4 and the found value $\Delta\tau$ of the OSC for the pair of coordinates $\Delta X^+_1$ and $\Delta X^-_1$(or $\Delta X^-_{N1}$ or $\Delta X^-_{N1+1}$) from the equation solver 5 are sent to the summator 7 for generating the corrected synthetic traces $U(t-\Delta\tau_1,\Delta X_1^+,\Delta X_1^-)$ according to the following relationship:

$$U(t-\Delta\tau_1, \Delta X_1^+, \Delta X_1^-) = u(t-\Delta\tau_{N1}, \Delta X_1^+, \Delta X^-_{N1}) +$$
$$+ [U(t-\Delta\tau_{N1+1}, \Delta X_1^+, \Delta X^-_{N1+1}) -$$
$$U(t-\Delta\tau_{N1}, \Delta X_1^+, \Delta X^-_{N1})] \frac{\Delta X_k^- - \Delta X^-_{N1}}{\Delta X^-_{N1+1} - \Delta X^-_{N1}}$$

The corrected sythetic trace $U(t-\Delta\tau_1,\Delta X_1^+,\Delta X_1^-)$ corresponds to a given value $\Delta X_1^+$ from arbitrary distribute coordinates $\Delta X_k^+$ of one of the source- receiver pairs along a long arm, (2) to the found value $\Delta X_1^-$ of a coordinate of the other of the pair from binomial (polynomial) root distribution with the given value (values) $\alpha$ of the asy-factor (factors), and (3) to the found value $\Delta\tau_1$ of the Oblique Spherical Correction with the given value $\beta$o and ro. This corrected synthetic trace from the summator 7 is sent to the storage device 8.

The whole described cycle of the corrected synthetic trace generating for the next value $\Delta X^+_2$ from the given arbitrary distribution, stored in the block 1 is repeated and so on until all the K-th corrected synthetic traces of the optimal corrected quasi-focusing gather are stored in the blocks (8)-(9). Then the step (c) and so on from the general procedure should be performed.

Figure 7:
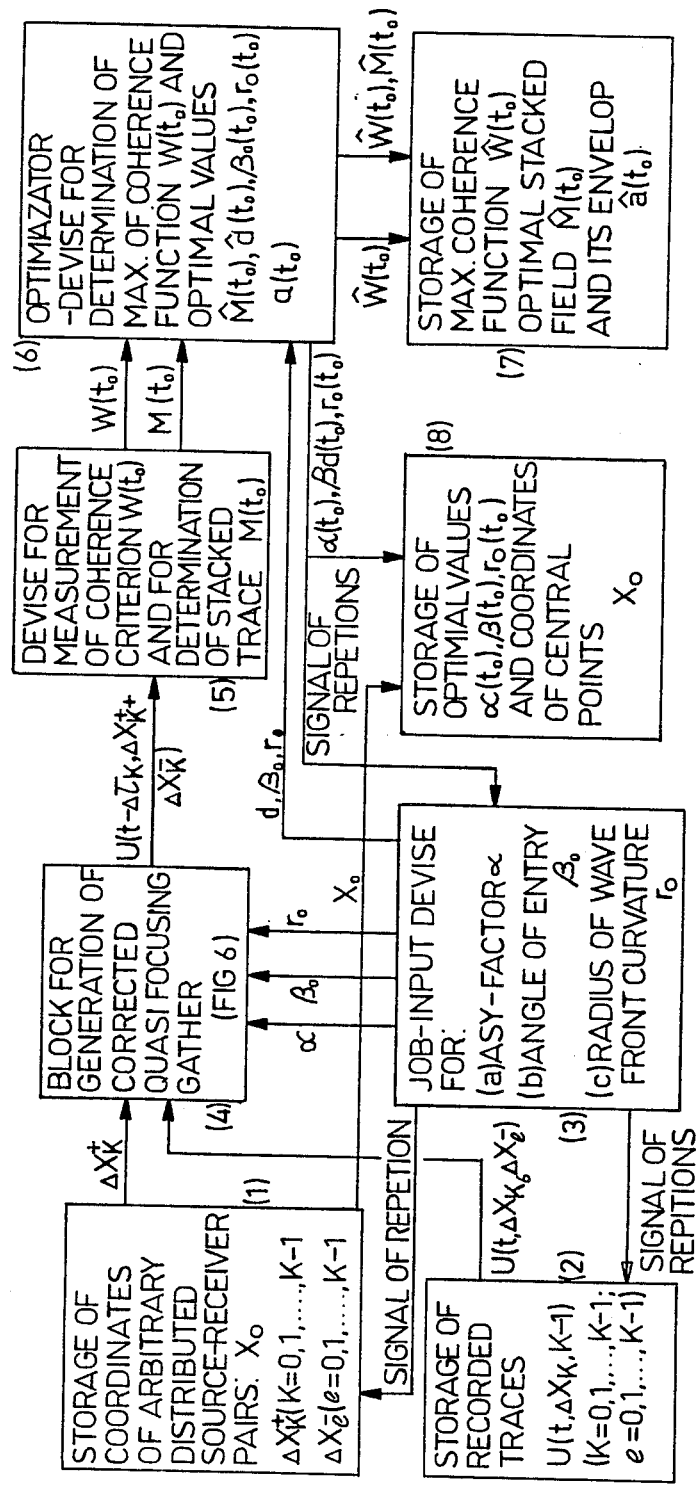
FIG. 7 is a block diagram for generating the optimally corrected quasi-focusing gather where the parameters are not known beforehand.

The third embodiment of the invention is intended for the situations encountered most frequently in the practice, while a plurality of seismic traces are recorded in the field according to given arbitrary distributions and the parameters of the optimal quasi-focusing distributions of source and receiverz and of the optimal Oblique Spherical Correction are unknown. Only sets of possible values of this parameter are known. FIG. 7 illustrates the method of generation of the optimal corrected quasi-focusing gather under these conditions.

The field recorded traces $U(t,\Delta X^+_k,\Delta X^-_l)$ and arbitrary distributed coordinates $\Delta X^+_k$ and $\Delta X^-_k$ of corresponding sources and receivers from the storages devices 2 and 1 are sent to block 4, which was described before (FIG. 6), for generation of the traces $U(t,\Delta X^+_k,\Delta X^-_k,\alpha,\beta o,ro)$ with fixed values of parameter $\alpha,\beta o$ and ro from the given sets of its possible values. These values of $\alpha,\beta o$ and ro are sent to block 4 from the job-input devices 3a, 3b and 3c. The outputs from the block 4 are the synthetic traces $U(t-\Delta\tau_k,\Delta X^+_k,\Delta X^-_k,\alpha,\beta o,ro)$ of the corrected quasi-focusing gather, which are sent to block 5 for measurement of some chosen coherence criterion. The semblance or Student's criterion or cross-correlation function, or another known or newly invented criterion, $W(t,\alpha,\beta o,ro)$ could be chosen, as a measure of coherence between the traces of the generated in block 4 corrected quasi-focusing gather with the fixed values of the parameters $\alpha,\beta o$ and ro.

The output from block 5 is a function $W(to,\alpha,\beta o,ro)$ of zero time to, which gives a value of the coherence measure for fixed values of the parameters $\alpha,\beta o$ and ro, received by block 5 from blocks 3a, 3b and 3c. In block 5 is also determined a stacked field $M(t_o,\alpha,\beta o,r_o)$.

The traces $W(to,\alpha,\beta o,ro)$ and $M(to,\alpha,\beta o,ro)$ are sent to the optimizer 6. In the first cycle after the method has begun to operate and the first trace $W(to,\alpha,\beta o,ro)$ has entered the optimizer 6, the last sends a signal to blocks 1, 2 and 3 to repeat a cycle of the determination of the second function $W^{(1)}(to,\alpha^{(1)},\beta o^{(1)},ro^{(1)})$ corresponding to other combination of the fixed values $\alpha^{(1)},\beta o^{(1)}$ and $ro^{(1)}$.

After the second pair of traces $W^{(1)}(to)$ and $M^{(1)}(to)$ corresponding three values $\alpha^{(1)},\beta o^{(1)}$ and $ro^{(1)}$ have entered in the optimizer 6, the last determines the larger value $W(to)$ of two compared traces $W(to)$ and $W^{(1)}(to)$ at each moment of zero time to, and the corresponding values $\hat{\alpha}(to),\hat{\beta}o(to)$ and $\hat{r}o(to)$ of the parameters and of the stacked field $\hat{M}(to)$.

The five traces $\hat{W}(to), \hat{M}(to), \hat{\beta}(to), \hat{\beta}(to)$ and $\hat{r}o(to)$ remain in the optimizer 6, which sends a signal to blocks 1, 2 and 3 to repeat determination of a coherence measure $W(to)$ and stacked field $M(to)$ for another combination of fixed parameters $\beta,\beta o$, and ro. After the trace $W^{(1)}(to)$ has been compared with the optimized before trace and the new optimized trace $\hat{W}(to)$ and the new corresponding stacked field $\hat{M}(to)$, the parameters $\hat{\alpha}(to), \hat{\beta}o(to)$ and $\hat{r}o(to)$ have been found, the cycle is repeated until all combinations of the given possible values of the parameters $\alpha, \beta o$ and ro have been tested.

The output from the optimizer 6 after performing all of the cycles is the five traces $\hat{W}(to), \hat{M}(to), \hat{\alpha}(to), \hat{\beta}o(to)$ and $\hat{r}o(to)$, which are the maximum value of coherence measure module and the corresponding values of the stacked field and of the parameters at each moment of zero time.

The found optimal corrected quasi-focusing gather with the asy-factor $\hat{\alpha}(to)$ and the OSC with the angle of entry $\hat{\beta}o(to)$ and the radius of wavefront curvature $\hat{r}o(to)$ is used in step (d) of the general scheme of the method.

Figure 8A:
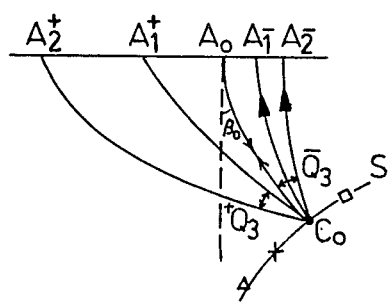
FIGS. 8a, 8b, 8c diagrams illustrating the rays showing mapping the Common Reflecting Point (CRP) into its image, at the center of curvature of a wavefront emitted by a fictitious source located at the CRP.

The disposition of sources $Ak^+(x=0,1,2,3)$ and receivers $Ak^-$ and ray scheme for a wave, reflected from the interface S at the same specular point Co, called the Common Reflecting Point (CRP) is shown in FIG. 8a. The seismic energy, radiated at a point $Ak^+$ and propagated down along a ray $Ak^+Co$, falls to a reflector S at the point Co and reflects upwards along a ray $CoAk^-$ to a point $Ak^-$. Thus, source-receiver pairs are disposed on a free surface in this way, that all specular points for all rays pairs coincide with the point of reflection Co for ray normally incident to the reflector and corresponding to the central point Ao of spread. An angle of reflection is equal an angle of incidence for each arriving ray (Snell's low). Since Snell's low is used in construction of depicted rays diagram, it actually means that a leading part of contributions to a field of a wave reflected at the CRP and recorded at points $Ak^-$, come from an element dS of a reflector S, comparable with the Fresnel zone. In other words, a wave reflects not only at the point Co, but by a some element dS of a surface S surrounding the CRP.

Figure 8B:
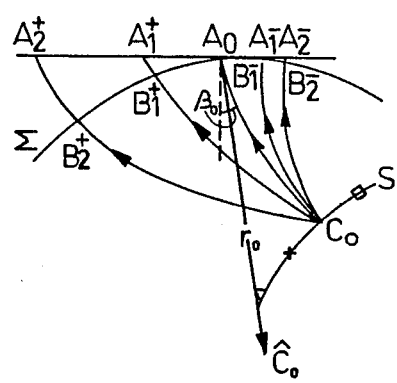

From consideration of the diagram of reflected rays (FIG. 8a) corresponding to the CRP, it is possible to associate with a problem of calculation of a plurality of arrival times $t(Ak^+CoAk^-)$ $(k=0,1,2,3)$ for a reflected wave, propagated from the point $Ak^+$ through point Co to the point $Ak^-$, a problem of calculation pairs of arrival times $t(CoAx^+)$ and $t(CoAk^-)$ of a wave emitted from a fictitious source located at the CRP on a reflector S to a couple of connected points $Ak^+$ and $Ak^-$ placed on a free surface (FIG. 8b). The rule determining two connected points on a free surface is determined by Snell's low and direction of a normal N at the CRE. The arrival time $t(Ak^+CoAk^-)$ of reflected wave is calculated with the help of the equation $$t(A_k^+ C_o A_k^-) = t(C_o A_k^+) +$$

$$t(C_o A_k^-) \ (k = 0, 1, \ldots) \ (A_o^+ = A_o^- = A_o).$$

Figure 8C:
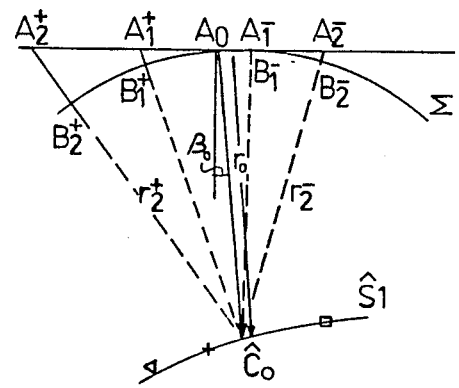

The front $\Sigma$ of a wave emitted by a fictitious source at point Co and coming at the central point Ao in the half zero time to/2 is depicted in FIGS. 8b and 8c. The center of this emitted front is at the point $\hat{C}o$. The wave front $\Sigma$ could be approximately considered as a spherical one in some a neighbourhood of the central point Ao. In this approximation, the centre of wavefront curvature could be considered as an imaginary source. The rays of wave coming from this imaginary source $\hat{C}o$ to the points $Ax^+$ and $Ax^-$ are shown in FIG. 8c by the dotted lines. The parts of rays $Bk^+Ak^+$ or $Bk^-Ak^-$, coming to the receivers and sources $Ak^+$ and $Ak^-$, from the Common Reflecting Point Co and from the center of curvature $\hat{C}o$, practically coincide, if a medium in the vicinity of a seismic line (or the reference level) could be regarded as a homogeneous medium with velocity of wave propagation Vo. The center of a front curvature - the point $\hat{C}o$ could be considered as some an image of the fictitious source Co, i.e. the image of the Common Reflecting Point.

In what follows, a seismic line $Ak^+AoAk^-(x=1,2,3 \ldots)$ is considered as an axis x and its direction forms an acute angle $\beta o$ with a central ray CoAo, equal to an angle of entry at a point Ao. Then offsets $A^+_k Ao = X_k^+ - Xo = \Delta X^+_k$ and $A_k^- Ao = X_k^- - Xo = \Delta X^-_k$ have opposite signs. Later on, it is assumed for definiteness that source offsets are positive (as in FIG. 8).

It follows from simple geometrical considerations, that a time delay (dynamic correction) for two connected points $Ax^+$ and $Ax^-$ is determined by the relation (FIG. 8c)

$$\Delta \tau_k = t(A_k^+ C_o A_k^-) - t(A_o C_o A_o) =$$

$$t(C_o A_k^+) + t(C A_k^-) - 2t(C_o A_o)$$

Now, we consider the situation that source-receiver pairs $Ax^+$ and $Ax^-$ are distributed along a seismic line in such a way that all rays paths $A_k^+ C_o A_k^-$ correspond to the same Common Reflecting Point $C_o$(FIGS. 8a and 8b). From kinematical considerations, it follows that the offset $\Delta X^+_k$ and $\Delta X^-_k$ of the source-receiver pair should be distributed along a seismic line according to the so-called associated polynomial distributions:

$$\Delta X_K^+ = y_k + \sum_{m=1}^{N} a_m y_k^{m+1} \ (k = 0, 1, \ldots, k-1)$$

$$\Delta X_k^- = -y_k + \sum_{m=1}^{N} a_m (-y_k)^{m+1}$$

where k is the number of a trace (pair), K is the number of traces in the gather, N is the given order to the polynomial, $am$ is the given coefficient, $y_k$ is an independent variable which values could be chosen arbitrarily (e.g., $y_k = 0, 1, 2 \ldots$).

The value of $am$ depends on the structure of the overburden and the geometry of the normal central ray CoAo. The degree of asymmetry of distributions $\Delta X^+_k$ and $\Delta X^-_k$ with respect to the central point Ao depends on the values of each of coefficient $am$, thus, $am$ is called the factor of asymmetry of m-th order, or in short, the asy-factor of the m-th order.

From a practical point of view, the most interesting types of the polynomial distributions are the associate binomial distributions:

$$\Delta X_k^+ = y_k + \alpha y_k^2, \ \Delta X_k^- =$$

$$-y_k + \alpha y_k^2 \ (k = 0, 1, \ldots, k-1)$$

where $$\alpha = \sin \beta_o / r_o + 2 \cos \beta_o \ L_o' / L_o^3$$

where, as pointed out earlier: ro is the radius of curvature of the wavefront emitted by a fictitious source located on the reflector at the Common Reflecting Point and coming to the central point Ao at an angle of entry $\beta o$ (FIG. 8b); Lo and $L^1o$ are the so-called 2D spreading function which characterizes the divergence of rays coming to the central point Ao and its derivative with respect to the angle of incidence When the non-homogeneity of the overburden is not very strong, then the second term in the expression for the asy-factor is negligible, so the asy-factor can be determined from the following approximate relationship:

$$\alpha = \sin \beta_o / r_o$$

In this case, there is the clear dependence between the parameters of the binomial distribution-the asy-factor and the parameters of the Oblique Spherical Correction $\beta o$ and ro.

In this case, the Oblique Spherical Correction is determined by one of the following equivalent relationships $$\Delta \tau_k = r_o (\sqrt{1 + 2\alpha \Delta X_k^+ + (\Delta X_k^+/r_o)^2} +$$

$$\sqrt{1 - 2\alpha |\Delta X_k^-| + (\Delta X_k^-/r_o)^2} - 2)/V_o$$

$$\Delta \tau_k = 2r_o (\sqrt{1 + y_k^2/h^2} - 1)/V_o$$

where $$h = r_o/\cos \beta_o = tg \ \beta_o/\alpha$$

There is another implementation on the basis of the associated polynomial (or binomial) distribution.

In this case, it is accepted that $y_k$ is not an independent variable. The offsets $\Delta X^+_k$ of one of the source-receiver pairs are distributed along a large arm according to an arbitrary (for example, uniform) distribution. Then the offsets $\Delta X^-_k$ of the other of the source-receiver pairs are distributed along a short arm according to the so-called polynomial root distribution $$\Delta X_k^- = -y_k + \sum_{m=1}^{N} a_m (-y_k)^{m+1}$$

where $y_k$ is the root of the following polynomial equation $$y_k + \sum_{m=1}^{N} a_m y_k^{m+1} = \Delta X_k^+$$

where $\Delta X^+_k$ is a given offset along a large arm.

In the case of the binomial distribution, the offsets $\Delta X^+_k$ of one of the source-receiver pairs are distributed along the large arm according to an arbitrary distribution; the corresponding offsets on the short arm are distributed according to the so-called binomial root distribution:

$$\Delta X_K^- = \Delta X_K^+ - 2y_K$$

where $$y_K = (\sqrt{1 + 4\alpha\Delta X_K^+} - 1)/Z\alpha.$$

DETAILED DESCRIPTION OF PREFERRED EMBODIMENTS

The block diagram of the general scheme of the invention is shown in FIG. 5. The multiple coverage data, represented by a plurality of recorded seismic traces, corresponding to a plurality of the source-receiver pairs, are distributed in the field according to the one pair of the said above (associated polynomial [binomial] or arbitrary-root polynomial [binomial]) distributions. The recorded traces and coordinates of the sources and receivers $\Delta X^+_k$ and $\Delta X^-_k$ corresponding to each recorded traces are sent to the storages devices 3 and 2 respectively.

For example, in the case of a twelve-fold coverage, a plurality of records corresponding to the predetermined central point contains twelve seismic traces. Each recorded trace $U_k(t)$ from block 3, and the given value of radius of curvature ro of the wavefront emitted by a fictitious source located at the Common Reflecting Point and coming at the central point at a give angle of entry $\beta$o, are generated by the job-input device 4b and 4a, and are sent to device 5 for time delay determined by the Oblique Spherical Correction.

The corrected trace $U_k(t_o - \Delta\tau_k)$ from block 5 is sent to summator 6, which sends a signal to the storage device 3 to send next recorded trace $U_{k4}(t)$, until all twelve corrected traces are stored in the summator. The stack of traces $M(t_o)$ and its envelope $a(t_o)$, also determined in the summator 6, the corresponding parameters $\beta$o and ro of the Oblique Spherical Correction, and the coordinates of the predetermined center points, are sent to the storage devices 9 and 8. The coordinate xo of the center point, and parameters $\beta_o$ and ro from the device 4a and 4b, are also sent to block 7 for determination of the coordinates $\hat{X}$ and $\hat{Z}$ of the image point $\hat{C}o$. The values $\hat{X}$ and $\hat{Z}$, and the envelope $a(t)$ from block 6, are sent to the display for image section construction after repetitions of cycles for a plurality of the central points.

The image of each reflecting interface is a locus of the centers of curvature of the wavefronts emitted by the fictitious sources located at the Common Reflecting Points, which are points of intersection of normal rays, leaving the central points, with the reflecting interface. In other schemes, the values from block 7 and 8 can be sent for subsequent data processing, e.g., for interval velocity estimation and migration.

From the above, it follows that the stacked trace for the polynomial (binomial) or polynomial (binomial) root distributed traces of a gather, corrected according to the Oblique Spherical Correction, with the parameters properly chosen, could be regarded as if the field reflected at the Common Reflecting Point $C_o$ were focused at the image point $\hat{C}_o$ (FIG. 8). This equivalence has sense only in the kinematic context. From a dynamic point of view, the stacked field is not equivalent to the field focused at the image point. Therefore, the proposed distributions of source-receiver pairs are called quasi-focusing ones.

In most cases, the implementation on the basis of the above-described distributions of the source-receiver pairs would be inconvenient. Therefore, the two other embodiments of the invention are described. In both, it is assumed that the plurality of source-receiver pairs are distributed in the field according to arbitrary distributions.

In one of the latter embodiments, hereinafter called the second method, it is assumed that the values of the parameters of the optimal quasi-focusing distributions (the asy-factor $\alpha m$ or simply $\alpha$), and of the Oblique Spherical Correction, are given. The object of the second method to generate so-called the optimal corrected quasi-focusing gather, i.e., a plurality of the synthetic seismic traces, corresponding to the given optimal quasi-focusing distributions of the source-receiver pairs and optimally corrected according to the given Oblique Spherical Correction.

The scheme of the second method is shown in FIG. 6. Here, a plurality of the recorded seismic traces, corresponding to arbitrary distributions of sources and receivers, and corresponding coordinates of sources and receivers, are stored in the blocks 2 and 1. For example, in the case of the twelve-fold coverage, the 144 recorded traces and twelve pairs of coordinates of source-receivers are stored in blocks 2 and 1.

The value of the asy-factor, and which arm is the larger one, are given. The first given coordinate $\Delta X^+_1$ on the large arm from the storage device 1, and the given value of the asy-factor $\alpha$ from the job-input device 3a are sent to device 4 for determination of the corresponding coordinate $\Delta X^-_1$ on the short arm according to the above-described expressions for the binomial quasi-focusing distribution. In the same device 4, the neighbouring actual arbitrary distributed coordinates $\Delta X^-_{N1}$ and $\Delta X^-_{N1+1}$ are found; e.g., if the field distributions are uniforml with $\Delta X^-_k = \Delta X^+_k = \Delta X = 200$ m, and the $\alpha = 0.00028$ then offset $\Delta X^-_1 = 180$ m on the short arm corresponds to given $\Delta X^+_1 = 200$ m on the large arm. The two neighbouring actual coordinates are $\Delta X^-_{N1} = 0$ and $\Delta X^-_{N1+1} = 200$ m. Then the coordinate $\Delta X^+_1$ (e.g. 200 m) on the long arm, and the three determined coordinates $\Delta X^-_1$ (180 m), $\Delta X^-_{N1}$ (0.0 m) and $\Delta X^-_{N1+1}$ (200 m) from the device 4 and the values of $\beta$o and ro from the job-input device 3b and 3c respectively are sent to the computer 5 for determination of the three neighbouring values $\Delta\tau_1$, $\Delta\tau_{N1}$ and $\Delta\tau_{N1+1}$ (.e.g., 0.005s, 0.001s, 0.008s) of the Oblique Spherical Correction according to one of the above-described expressions for the three neighbouring pairs of coordinates ($\Delta X^+_1$, $\Delta X^-_1$), ($\Delta X^+_1$, $\Delta X^-_{N1}$) and ($\Delta X^+_1$, $\Delta X^-_{N1+1}$). A pair of recorded traces $U(t, \Delta X^+_1, \Delta X^-_{N1})$ and $U(t, \Delta X^+_1, \Delta X^+_{N1+1})$ (for considered example, $U(t, 200, 0)$ and $U(t, 200, 200)$) from the storage device 2 and the found values $\Delta\tau_{N1}$ and $\Delta\tau_{N1+1}$ (for considered example, 0.001 and 0.008) from the computer 5 are sent to device 6 for time shift and for obtaining the time corrected traces $U(t_o - \Delta\tau_{N1}, \Delta X^+_k, \Delta X^-_{N1})$ and $U(t_o - \Delta\tau_{N1+1}, \Delta X^+_1, \Delta X^-_{N1+1})$ (for considered examples $U(t_o - 0.001; 200, 0)$ and $U(t_o - 0,008; 200, 200)$. The last two corrected traces from blocks 6, the found positions $\Delta X^-_1$, $\Delta X^-_{N1}$ and $\Delta X^-_{N1+1}$ on the short art from block 4 and the found value $\Delta \tau_1$ (e.g. 0.005s) for the pair $\Delta X^+_1$ and $\Delta X^-_1$ from the computer 5, are sent to the summator 7 for generating the corrected synthetic trace $U(t^-_o\Delta \tau_1, \Delta X^+_1, \Delta X^+_1)$; for the considered example, $U(t_o-0.005,200,180)$ according to the following relationship:

$$u(t_0 - \Delta\tau_1, \Delta X_1^+, \Delta X_4^-) = u(t_0 - \Delta\tau_{N1}, \Delta X_1^+, \Delta X_{N1}^-) +$$

$$[u(t_0 - \Delta\tau_{N1+1}, \Delta X_1^+, \Delta X_{N1+1}^-) -$$

$$u(t - \Delta\tau_{N1}, \Delta X_1^+, \Delta X_{N1}^-)] \frac{\Delta X_1^- - \Delta X_{N1}^-}{\Delta X_{N1+1}^- - \Delta X_{N1}^-}$$

(or for considered example, $$u(t_0 - 0.005;200,180) = u(t_0 - 0.001;200,0) +$$

$$[u(t_0 - 0.008,200,200) - u(t_0 - 0.001;200,0)] \frac{180 - 0.0}{200 + 0.0}$$

The corrected synthetic trace $U(t_o-\Delta\tau_1, \Delta X^+_1, \Delta X^-_1)$ corresponds to a given value $\Delta X^+_1$ (200 m) of the given arbitrary distributed coordinates on the large arm and to a found value $\Delta X^-_1$ (180 m) of the binominal root distribution on the short arm with a given value of the asy factor $\alpha$ (0.00028) and to the found value $\Delta \tau_1$ (0.005s) of the OSC with given values $\beta o$ and ro. This synthetic trace from the summator 7 is sent in the storage device 8.

The whole cycle of generating the corrected synthetic traces $U(t_o-\Delta\tau_k, \Delta X^-_k)$ is repeated with the same fixed given values of $\alpha$, $\beta o$ and ro, until all (K−1) corrected synthetic traces and recorded zero-offset trace $U(t_o,0,0)$, corresponding to the optimal corrected quasi-focusing gather, are generated and placed in the storage device 8. The given parameters $\alpha$, $\beta o$ and ro are stored in blocks 9.

In most cases, the parameter of the optimal quasi-focusing distributions of source and receiver, and of the Optimal Oblique Spherical Correction, are unknown, only the regions of possible values of its parameters known beforehand, i.e., the sets of possible values of $\alpha$, $\beta o$ and ro could be given. The object of the third method is to determine the optimal corrected quasi-focusing gather from multiple coverage data represented by a plurality of recorded seismic traces corresponding to a plurality of source-receiver pairs, distributed in the field according to arbitrary distributions, while sets of possible values of the parameters of the optimal binomial (polynomial) distribution and of the optimal Oblique Spherical Correction are given.

Figure 9:
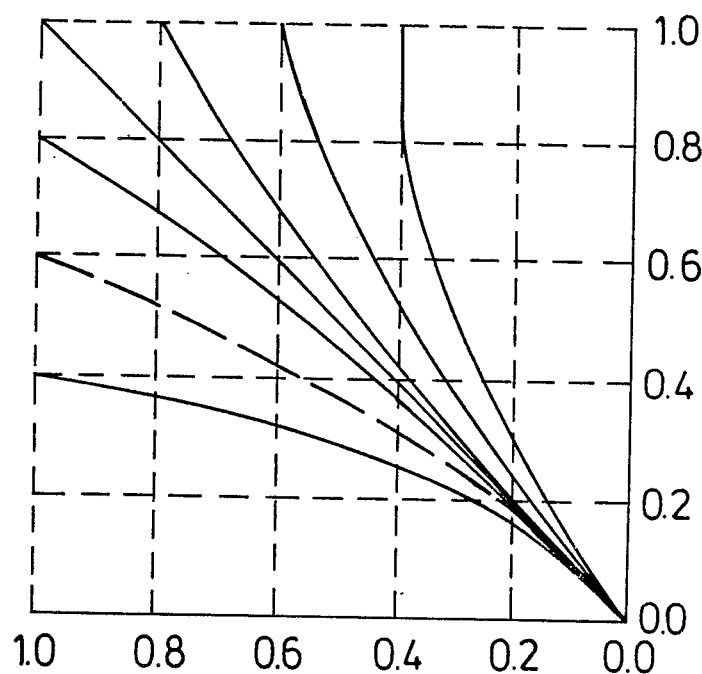
FIG. 9 is a normalized stacking chart illustrating the directions of the common source (receiver) points in dotted lines, and of the common reflecting elements in solid lines.

Reference is made to the stacking chart of FIG. 9 for a better understanding the principles of the proposed third method. This stacking chart is a square, called the observation square, inside of which sets of curves are situated. Its lower right vertex corresponds to the fixed zero offset central point Ao. The lower horizontal side of the observation square corresponds to the left arm at a spread. The right vertical side is the right arm of the spread turned at the angle $\pi/2$. It is convenient to consider a normalized stacking chart, for which the length of the large arm is equal to one ($\Delta X^+_{max}=1$).

FIG. 9 illustrates the normalized stacking chart. The dotted vertical (horizontal) straight lines correspond to the Common Source (Receiver) Point configurations or vice versa. The intersection of each vertical (horizontal) line with horizontal (vertical) side of the observation square determines the normalized coordinate of a source (receiver). The solid straight line, inclined at the angle $\pi/4$ corresponds to the Common Middle Point configuration. Each solid curved line corresponds to the binomial or binomial root configuration of source-receiver pairs with the fixed value of the asy-factor. It is convenient for a stacking chart consideration to use, instead of the asy-factor as a parameter of a binomial distribution, the other parameter, namely a value of the coordinate of the intersection of corresponding curve with the left vertical (or upper horizontal) side of the observation square. This coordinate is called the factor of symmetry, or in short, sy-factor ($\sigma$), which is equal to the ratio $$\sigma = |\Delta X^-_{max}|/\Delta X^+_{max}$$

of the length of the short arm $|\Delta X^-_{max}|$ to the length of the large arm $\Delta X^+_{max}$. The asy-factor $\alpha$ is bounded with the sy-factor $\sigma$ by the following relationship $$\alpha = 2(1 - \sigma)/\Delta X^+_{max} (1 + \sigma)^2.$$

Figure 10:
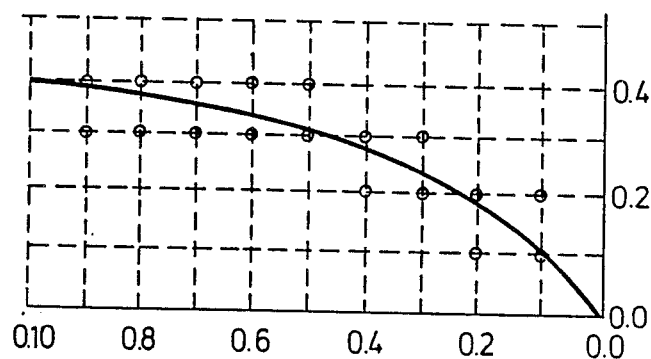
FIG. 10 illustrates the portion of the stacking chart explaining the operation of the summator in the block diagram of FIG. 6.

FIG. 10 illustrates the scheme explaining the operation of the second method. The solid lines determine the given quasi-focusing configuration of the source-receiver pairs with a large left arm with a and fixed value of the sy-factor $\sigma$ equal to 0.4. The dotted vertical lines correspond to the 12 Common Source Points recoding configuration. The cross located on this line show the position of the source-receiver pairs (traces) used by generating the synthetic traces. The positions of the source-receiver pairs corresponding to the given binomial root distribution of offsets (with $\sigma=0.4$) on the short arm and to the given arbitrary (iniform, in the considered example) distribution are denoted by crosses. The weighed summation of two corrected recorded traces, performed in the second method in the summator 6 of FIG. 6, corresponds to procedure of interpolation of two corrected recorded retraces with positions of a source-receiver pair shown by two corresponding cycles located on the same vertical line as the considered cross.

FIG. 7 illustrates the scheme for the third method. The recorded traces $U(t,\Delta X^+_k, \Delta X^-_l)$ of arbitrary distributed sources and receivers and corresponding values of offsets $\Delta X^+_k$ and $\Delta X^-_l$(K,l=0,1,..., K−1) are placed in the storage devices 2 and 1, respectively. The sets of the possible values of parameters of the quasi-focusing distribution and of the Oblique Spherical Correction are given. The recorded traces $U(t, \Delta X^+_k, \Delta X^-_l)$, their offsets $\Delta X^+_k$ and $\Delta X^-_l$ from the blocks 2 and 1, and the fixed combination of the parameter $\alpha$, $\beta o$ and ro, produced by the job-input device 3, 3b and 3c from the given sets of this parameter, are sent to the block 4 which generates the sythetic traces of the corrected quasi-focusing gather with the said combination of values $\alpha$, $\beta o$ and ro, in accordance with the FIG. 6 diagram.

The output of block 4, namely the traces $U(t_o-\Delta\tau_k, \Delta X^+_k, \Delta X^-_k,\alpha,\beta o,ro)$ of the corrected binomial gather, are sent to block 5 for measurement of some chosen coherence criterion (measure). The semblance or Student's criterion, or cross correlation function, or other known or newly invented criterion $W(t_o, \alpha, \beta o, r)$ could be used as a measure of coherence between the synthetic traces of the corrected binomial (polynomial)

gather with fixed values of the parameters $\alpha$, $\beta o$ and $ro$. The output from block 5 is a function $W(t_o, \alpha, \beta o, ro)$ of zero time to, which gives a value of the chosen measure of coherence for the fixed values $\alpha$, $\beta o$ and $ro$.

For example, if Student criterion W(to) is chosen as a measure of coherence to the twelve-fold coverage system of observation, then the Student's criterion is determined by the relationships:

$$W(t_0;\alpha,\beta_0,r_0) = M(t_0;\alpha,\beta,r_0) \sqrt{K} / S(t_0;d,\beta_0,r_0)$$

where:

$$M(t_0;\alpha,\beta_0,r_0) = \frac{1}{K} \sum_{K=0}^{K-1} u_K(t_0 - \Delta T_K;\alpha,\beta_0,r_0)$$

is the estimated average of the seismic field (stacked trace)

$$S(t_0;d,\beta,r_0) = \sqrt{\frac{1}{K-1} \sum_{K=0}^{K-1} [u_K(t - \Delta T_K;\alpha,\beta_0,r_0) - M(t_0;\alpha,\beta_0,r_0)]^2}$$

is the estimated standard deviation of the field U; and K is the number of traces in the gather (for the considered, example, K=12). The stacked trace M(t) is also outputted from block 5.

The traces $W(t_o, \alpha, \beta o, ro)$ and M(t) and values of $\alpha$, $\beta o$ and $ro$ are sent to the optimizer 6. In the first cycle after the method has begun to operate and the first trace $W(t_o, \alpha, \beta o, ro)$ has entered the optimizer 6, a signal is sent to blocks 1, 2 and 3 to repeat a new cycle for determining the second function $W^{(1)}$ (to, $\alpha^{(1)}$, $\beta o^{(1)}$, $ro^{(1)}$), corresponding to other combination of fixed values $\alpha^{(1)}$, $\beta o^{(1)}$ and $ro^{(1)}$ of the parameters of the binomial distribution and of the OSC.

Figure 11:
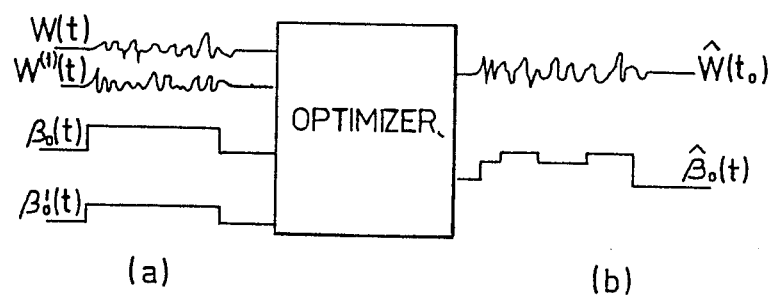
FIG. 11 illustrates the operation of the optimizer in the block diagram of FIG. 7.

After the second trace $W^{(1)}$ (to) and its parameters $\alpha^{(1)}$, $\beta o^{(1)}$ and $ro^{(1)}$ have reached the optimizer 6, determinations are made of the larger value $W(t_o)$ of two compared traces $W(t_o)$ and $W^{(1)}(t_o)$ at each moment of zero time to, and the corresponding values $\hat{\alpha}(t_o)$, $\hat{\beta}_o(t_o)$ and $\hat{r}_o(t_o)$ of the parameters. For example, two combinations of the input in the summator 6 is shown in FIG. 11a and its output - the traces $\hat{W}(t_o)$ and $\hat{\beta}_o(t_o)$ are shown in FIG. 11b.

These five traces $\hat{W}(t_o)$, $\hat{M}(t_o)$, $\hat{\alpha}(t_o)$, $\hat{\beta}_o(t_o)$ and $\hat{r}_o(t_o)$ remain in the optimizer 6, which gives a signal to begin a new cycle. The cycles are repeated until all the synthetic corrected binomial (polynomial) gathers corresponding to all possible combinations of value of the parameters $\alpha$, $\beta o$ and $ro$ from the given sets are determined and sent to the optimizer 6, and a maximum value of coherence measure $\hat{W}(to)$ and corresponding average stacked field M(to) and the parameters $\hat{\alpha}(t_o)$, $\hat{\beta}_o(t_o)$ and $\hat{r}_o(t_o)$ at each moment of zero time, are determined. These five traces $\hat{W}(t_o)$ $\hat{M}(t_o)$, $\hat{\alpha}(t_o)$, $\hat{\beta}_o(t_o)$ and $\hat{r}_o(t_o)$ are output from block 6 and are sent in the storage device 7 and 8. They could be used or for construction of an image section of a studied medium or for subsequent data processing.

Figure 12:
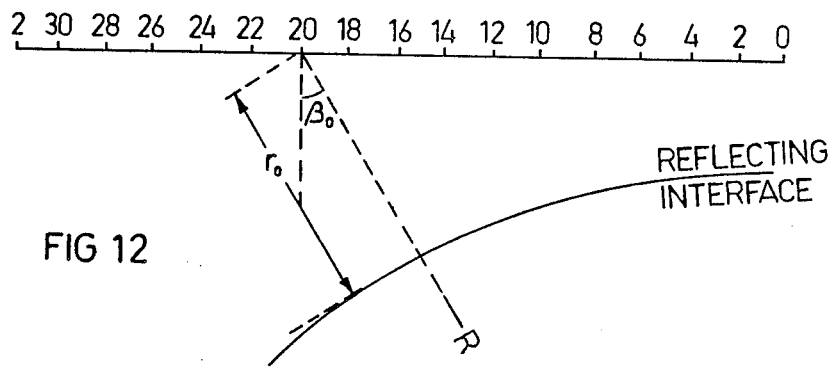
FIG. 12 illustrates a model used as a basis for calculating the theoretical common short point seismogram.
Figure 13:
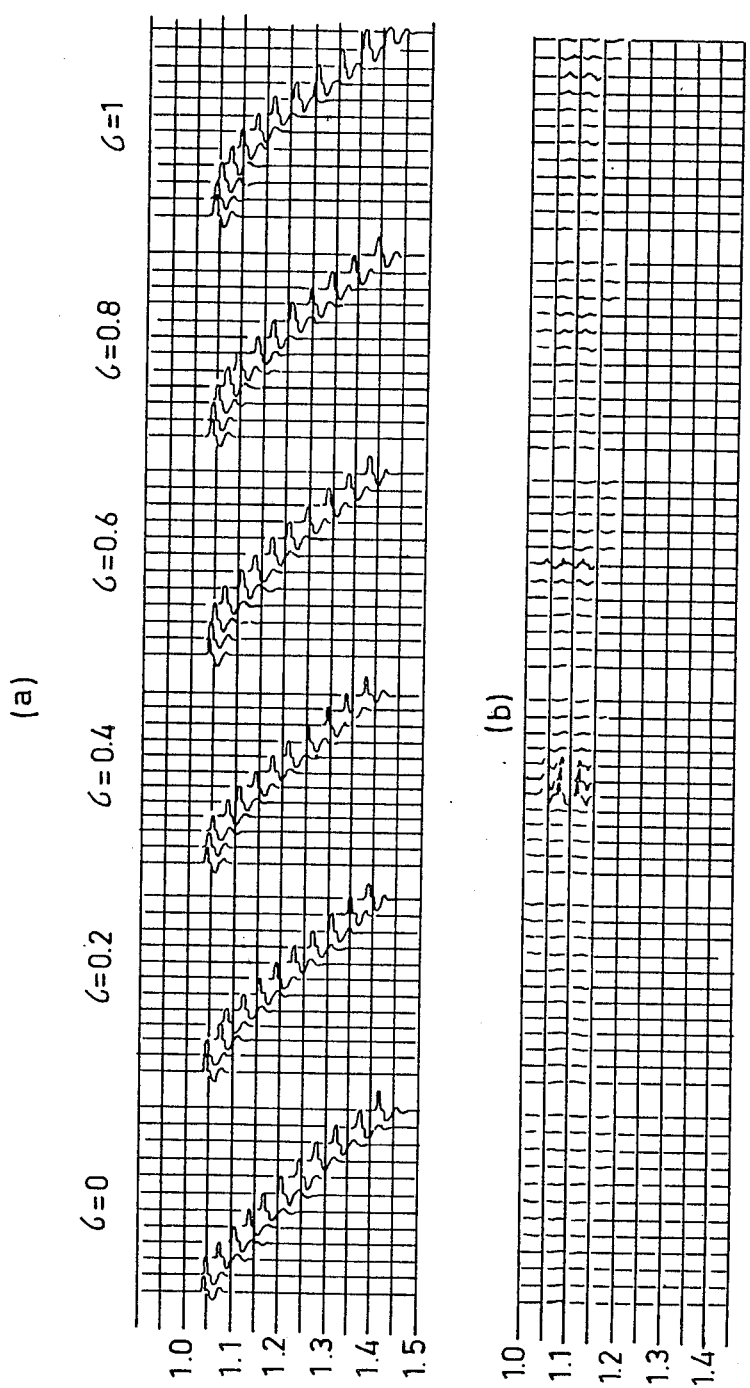
FIG. 13 illustrates some results of the present invention.

FIGS. 12 and 13 illustrate the results of testing the principal blocks of the above-described methods. The model of the medium for which the theoretical seismograms was calculated is shown in FIG. 12. The fields of reflected waves were computed for the Common Short Point configurations with the twelve-fold coverage length of each speed $\Delta X^+_{max}$ is equal to 11.

The predetermined central point $A_o$ has the coordinate Xo equal to 20. For this central point, the radius ro is equal to 10.3, and an angle of entry $\beta o$ is equal to 29.7⁰.

The twelve CSP gathers (or 144 recorded traces) was placed in storage device 2 (FIG. 7). The sets for possible values of parameters of the binomial root distribution and the OSC are as follows:

the sy-factor $\sigma = 0$; 0.2; 0.4; 0.6; 0.8; 1.0
the radius of curvature $r_o = 5, 6, \ldots, 15, 16$.

In the case of a homogeneous overburden, the approximate relationship $\alpha = \sin \beta_o / r_o$ is very accurate.

FIG. 13a illustrates the 6 uncorrected binomial root gather, obtained by using some crucial blocks from the block diagram 6.

FIG. 13c illustrates the 72 traces of coherence criterion (Student's). Each set of 12 traces corresponds to the fixed gather. Each trace of this set corresponds to the fixed value of radius of curvature.

The values of Student's criterion, recorded in the interval 1.03-1.14 on some traces of the gather with $\sigma = 0.4$ and $\sigma = 0.6$ are essentially greater than the value of threshold corresponding to normal level of noise. The maximum values W(to) are recorded on the trace with $\sigma = 0.4$ (or $\alpha = 0.055$) and ro-10 (sometimes ro-11). Using the expression sin $\beta o = ro\alpha$, one obtains the following estimation sin $\beta o = 0.55$. The true values of ro and sin $\beta o$ are 10.3 and 0.5, respectively.

While the invention has been described with respect to an implementation by analog devices, it will be appreciated that the invention could also be implemented by a digital computer, using any one of the many known general purpose digital computers programmed according to known programming techniques for performing the above-described operations. Further variations, modifications and other applications of the invention will be apparent.

What is claimed is:

1. Method of analysing the structure of a medium by means of waves reflected by inner interfaces, comprising:
   (a) generating multiple coverage data represented by traces corresponding to a plurality of source-receiver pairs distributed according to an asymetric polynomial distribution with respect to a predetermined central point with optimal parameters which provide that all reflected events of such traces correspond to the same common reflecting point on a reflecting interface;
   (b) correcting the recorded traces according to an optimal time delay correction which converts all reflected events to the same phase and which depends on the local parameters of wave propagation velocity Vo at the reference level, and of radius of curvature $r_o$ of the wavefront emitted by a fictitious source located at the common reflecting point and coming to the central point at an angle of entry $\beta o$;
   (c) stacking said corrected recorded traces;
   (d) repeating (a), (b) and (c) for a plurality of predetermined common reflecting points to produce a plurality of the stacked traces; and
   (e) utilizing said stacked traces and parameters ro and $\beta o$ as a function of said predetermined central point, and the time $t_o$ of registration of the data at this point for determining the structure of the medium.

2. The method according to claim 1, including the further step, following step (c), of producing an image of the common reflecting point having coordinates depending on the parameters ro and βo of the time delay correction, step (d) producing an image of the inner interfaces.

3. The method according to claim 1, applied to seismic prospecting, wherein the recorded traces are seismic traces.

4. The method according to claim 1, applied to tomographic or non-destructive testing of a body, wherein the recorded traces are reflected sonic waves applied to the tested body.

5. The method according to claim 1, wherein step (a) is performed by distributing the source-receiver pairs in the field according to said polygonal distribution, and step (b) is performed according to said time delay correction.

6. The method according to claim 1, wherein steps (a) and (b) are performed with traces recorded in the field by distributing the source-receivers pairs in the field according to an arbitrary non-polynomial distribution, and under condition that the parameters of the polynomial distribution and the time delay correction are predetermined; and a plurality of synthetic traces called synthetic gather are generated from the said field data by:
   (1) determinging the optimal offset of one of each source-receiver pair on a small arm of a spread, corresponding to the actual given field position of the other of the pair on a long arm;
   (2) determining the time delay corrections corresponding to both actual neighboring and optimal positions of the source-receiver pairs;
   (3) obtaining corrected traces by introducing said time delay correction in said traces recorded in the field; and
   (4) generating said synthetic traces by weighing in pairs the corrected traces obtained in step (3) above, and stacking them.

7. The method according to claim 1, wherein said steps (a), (b) and (c) are performed with traces recorded in the field by distributing the source-receiver pairs in the field according to arbitrary non-polynomial distributions and under conditions that the optimal parameters of said polynomial distribution and said time delay correction are not known; and a plurality of synthetic gathers are generated for a plurality of predetermined combinations of said parameters from the said field data by:
   (1) measuring values of chosen criteria of coherence for said plurality of synthetic gathers generated from the field recorded traces;
   (2) optimizing the results of the coherence measurements at each moment of zero time $t_o$; and
   (3) determinging the parameters of an optimally corrected polynomial gather and of the optimal stacked wave field at each moment of zero time $t_o$.

8. The method according to claim 6, wherein the field or synthetic traces are of a multiple coverage system of observation and are generated according to a quasi-focusing distribution of the source-receiver pairs, according to the two following associated polynomial distributions $$\Delta X_K^+ = y_K + \sum_{m=1}^{N} a_m y_k^{m+1} \ (K = 0,1,\ldots,L-1)$$

$$\Delta X_K^- = -y_K + \sum_{m=1}^{N} a_m(-y_K)^{m+1}$$

where L is a number of a seismic trace/source-receiver pair:
   $\Delta X^+{}_k$ is the offset of the pair on the long arm of a spread;
   $\Delta X^-{}_k$ is the offset of the other of the pair on the short arm;
   K is the number of seismic traces;
   $a_m$ is a given polynomial coefficient (according to the distribution asymmetry);
   N is a given order of the polynomial distribution; and
   $y_k$ is an independent variable, which takes values from a given sequence of numbers (e.g., for discrete values $y_k = 0,1,2,\ldots K$).

9. The method according to claim 6, wherein the field or synthetic traces of the multiple coverage system of observation are generated according to the quasi-focusing distributions of the source-receiver pairs corresponding to the following associated binomial distribution:

$$\Delta X_K^+ = y_K + ay_K^2, \ \Delta X_K^- = -y_K + ay_K^2 \ (K = 0,1,\ldots L-1)$$

$$\text{or } \Delta X_K^+ = y_K/(1 - \Delta y_K), \ \Delta X_K^- = -y_K/(1 + \Delta y_K)$$

$$a = \sin\beta_6/r_0 + 2\cos\beta_6 L_0^1/L_0^3$$

where $a$ is a binomial coefficient, called an asy-factor; and ro is the radius of curvature of a wavefront emitted by a fictitious source located at the common reflecting point and coming to the predetermined central point at an angle of entry βo.

10. The method according to claim 6, wherein the field or synthetic traces of the multiple coverage system of observation are generated according to one given arbitrary distribution of one of the source-receiver pairs $\Delta X_k^+$ along the long arm and according to the following quasi-focusing distribution of the other of the pair along of the short arm:

$$\Delta X_K^- = -y_K + \sum_{m=1}^{N} a_m(-y_K)^{m+1} \ (K = 0,1,\ldots,L-1)$$

where $y_k$ is a root of the following polynomial equation $$y_K + \sum_{m=1}^{N} ay_K^{m+1} = \Delta X_K^+$$

where $\Delta X_k^+$ is a number from the given arbitrary distribution of offsets along the large arm.

11. The method according to claim 6, wherein the field or synthetic traces of the multiple coverage system of observation are generated according to one given arbitrary distribution of one of the source-receiver pair $\Delta X^+{}_k$ along the large arm and according to the following quasi-focusing distribution of the other of the pair along the short arm:

$$\Delta X_K^- = \Delta X_K^+ - 2y_K \text{ or } \Delta X_K^- = -\Delta X_K^+/(1 + 2a\Delta X_K^+)$$

where

-continued $$y_K = (\sqrt{1 + 4\alpha\Delta X_K^+} - 1)/2\alpha$$

$$\alpha = \sin\beta_0/r_0$$

$\Delta X^+_k$ is a number from the given arbitrary distribution along the large arm and ro is the radius of curvature of a wavefront emitted by the fictitious source located at the common reflecting point and coming to the predetermined central point at angle of entry $\beta$o.

12. The method according to claim 1, wherein the time delay correction is an optimal oblique spherical correction effected according to the following relationship:

$$\Delta\tau_K = \frac{\sqrt{r_0^2 + 2r_0\Delta X_K^+\sin\beta_0 + (\Delta X_K^+)^2} + \sqrt{r_0^2 - 2r_0|\Delta X_K^-|\sin\beta_0 + (\Delta X_K^-)^2} - 2r_0}{v_0}$$

where $\Delta\tau_k$ is a time delay for the K-th trace relatively to the central trace, and ro is the radius of curvature of a wavefront emitted by a fictitious source located at the common reflecting point and coming to the central point at an angle of entry $\beta$o and Vo is the velocity of wave propagation near the reference level.

13. The method according to claim 1, wherein the time delay correction is effected according to the following relationship:

$$\Delta\tau_K = 2r_0(\sqrt{1 + y_K^2/j^2} - 1)/V_0$$

where h=ro/cos 0o $\Delta\tau^-_k$ is a time delay for the K-th trace.

* * * * *